United States Patent [19]

Henne et al.

[11] 4,267,047
[45] May 12, 1981

[54] DIALYZING MEMBRANE WITH ADSORBENT LAYER

[75] Inventors: Werner Henne; Gustav Dünweg; Werner Schmitz; Raimund Pohle; Friedrich Lawitzki, all of Wuppertal, Fed. Rep. of Germany

[73] Assignee: Akzo N.V. of Arnhem/Nederland, Arnhem, Netherlands

[21] Appl. No.: 30,705

[22] Filed: Apr. 16, 1979

Related U.S. Application Data

[62] Division of Ser. No. 809,486, Jun. 23, 1977, Pat. No. 4,164,437.

[30] Foreign Application Priority Data

Feb. 11, 1977 [DE] Fed. Rep. of Germany ....... 2705734

[51] Int. Cl.³ .............................................. B01D 39/18
[52] U.S. Cl. ................................... 210/490; 210/492; 210/502; 210/500.2
[58] Field of Search ................ 210/22 R, 22 A, 22 C, 210/22 D, 23 R, 23 H, 23 F, 27, 490, 492, 500 M, 502, DIG. 23; 55/16, 158; 435/179, 182; 428/376, 393; 156/167; 264/41, 171, 173, 174, 199, 209, 211

[56] References Cited

U.S. PATENT DOCUMENTS

| | | | |
|---|---|---|---|
| 3,318,988 | 5/1967 | McDowell | 264/191 |
| 3,455,818 | 7/1969 | Leifield | 210/502 |
| 3,695,445 | 10/1972 | Esmond | 210/493 M |
| 3,734,851 | 5/1973 | Matsumura | 210/22 |
| 3,742,946 | 7/1973 | Grossman | 210/500 M |
| 3,956,449 | 5/1976 | Wexler et al. | 264/139 |
| 4,127,481 | 11/1978 | Malchesky et al. | 210/22 A |

OTHER PUBLICATIONS

"Activated Carbon Fibers for Artifical Kidney Devices", 7th Ann. Contractors Conf. of Art. Kidney--Chronic Uremin Prog., Davis et al, pp. 111-112, 1974.
The Condensed Chemical Dictionary, 9th Edition, G. Hawley, copyright 1950, Van Nostrand-Reinhold Co., N.Y., pp. 920, 242, 485.
Cuprophan Technical Information Bulletin, No. 12, 9/1976, Enka Glianzstoffas, W. Germany.

Primary Examiner—Charles N. Hart
Assistant Examiner—David R. Sadowski
Attorney, Agent, or Firm—John H. Shurtleff

[57] ABSTRACT

A dialyzing membrane, especially for hemodialysis, formed as a hollow fiber, tubular foil or flat sheet by regeneration of cellulose from a cuprammonium solution, the membrane comprising at least two firmly adhered cellulosic layers including at least one dialyzing layer consisting essentially of a semipermeable regenerated cellulose and at least one adsorbent layer consisting of said regenerated cellulose containing embedded therein fine particles of an adsorbent material in an amount of up to 95% by weight with reference to the dry weight of the adsorbent layer, preferably 1 to 90% and especially 20 to 70% by weight, when the adsorbent layer is part of a hollow fiber structure. The dialyzing membrane of the invention is produced by a method requiring at least two cuprammonium cellulose solutions, one of which is free of adsorbent particles and another of which contains a suspension of adsorbent particles, the different solutions being spun from adjacent spinning slots for immediate layer to layer contact and then introduced over a short air gap into a coagulating or precipitating bath to entrap the adsorbent particles in the spun layer in which the particles were originally suspended. Isopropyl myristate is particularly advantageous as a liquid filler for the axial duct or canal of a hollow membrane.

15 Claims, 6 Drawing Figures

DIALYZING MEMBRANE WITH ADSORBENT LAYER

This is a division of application Ser. No. 809,486 filed June 23, 1977, now U.S. Pat. No. 4,164,437.

Considerable research has been done on dialyzing membranes for separation of an electrolyte in solution which passes through the membrane from collodial particles which are retained by the membrane. For use in artificial kidneys, a semipermeable membrane of regenerated cellulose as obtained by spinning a cuprammonium cellulose solution is especially suitable because the hydrodynamic properties of this cellulosic membrane and its permeability for metabolites in the human bloodstream have the correct relationship. As compared to a natural kidney, the artificial organ still exhibits deficiencies and there has been a considerable effort to develop new membranes and improved dialysis machines and techniques. The problems inherent in this art were especially identified in the study made by the Scribner School with respect to the importance of those molecules of intermediate weight, i.e. having a molecular weight from 500 up to about 3,000, generally referred to as "intermediate molecules" or "medium molecules".

Experiments with new membranes have led to some success in achieving a higher intermediate molecule permeability, but at the same time the hydrodynamic permeability (ultrafiltration) increases in part so strongly that entirely new dialysis techniques had to be developed in order to use such membranes without disadvantages.

Attempts have also been made to solve the problems in this art of hemodialysis by arranging the apparatus in such a way that the dialysate will flow through an adsorbent. Such an arrangement is described in the German published patent specification (DT-OS) No. 24 44 540. The dialysate chamber is separated by a semipermeable membrane from the blood chamber in a conventional manner but the dialysate chamber is then filled with an adsorbent material, preferably active carbon. It has been necessary in following this teaching to make a special selection of the type and form of the active carbon particles to make certain that the particles do not break during dialysis and damage the very fine and delicate membrane. However, this precaution in selecting the adsorbent does not by itself ensure a safe operation of the dialyzing apparatus, and the use of an adsorbent in this manner involves considerable risk for the patient.

Dialyzing membranes are generally produced in the form of hollow threads, thin-walled foil tubes or flat sheets or plates composed of a cellulose material which has been regenerated from a cuprammonium solution in a conventional manner to provide a semipermeable porous structure which is especially suitable for the dialysis of blood. It is an object of the present invention to combine the dialysis with an absorption of the dialysate while also ensuring a very safe operation. Other objects and advantages of the invention will become more apparent from the following detailed description and the appended claims.

In accordance with the invention, it has now been found that a highly improved and surprisingly effective dialysis and absorption can be achieved, especially for hemodialysis, by providing a dialyzing membrane in the form of a hollow fiber, a tubular foil or a flat sheet formed by regeneration of cellulose from a cuprammonium solution, the membrane comprising at least two firmly adhered cellulosic layers with at least one dialyzing layer consisting essentially of a semipermeable regenerated cellulose and with at least one adsorbent layer consisting essentially of a regenerated cellulose in which fine particles of an adsorbent material are embedded in an amount of up to 95% by weight of the absorbent layer, i.e. with reference to the dry weight of the special cellulosic layer containing the adsorbant. Preferably the proportion of the adsorbent when the dialysis membrane is in the form of a hollow fiber amounts to about 1 to 95% by weight with reference to the dry adsorbent layer, while in the dialysis membranes according to the invention in the form of foil tubes or flat sheets, this proportion of the adsorbent material amounts to 0.1 to 95% by weight.

Additions of the adsorbent particles in amounts of over 75% by weight are seldom necessary. Preferably, the proportion of the adsorbent is chosen in an amount of 20 to 70% by weight with reference to the dry adsorbent layer.

The thickness of the layer or the combined layers containing the adsorbent particles is preferably 10 to 100$\mu$.

The regenerated cellulose in each layer consists most advantageously of substantially pure cellulose, e.g. as obtained when using cotton linters in the cuprammonium process. If desired, however, a modified cellulose such as carboxymethyl cellulose may also be added or included as a cellulosic material, and other minor modifications of the regenerated cellulose molecules are permissible within the scope of the invention provided that the essential cellulosic structure of a dialyzing membrane is maintained Glycerine may also be added as a humectant and plasticizer, e.g. in amounts up to about 50% by weight, preferably about 10 to 40% by weight, with reference to the weight of the cellulose.

It is a further object of this invention to provide a unique method of producing the multilayer dialyzing and adsorption membrane as disclosed above having at least one layer consisting essentially of a semipermeable regenerated cellulose and at least one other layer consisting essentially of a regenerated cellulose containing embedded therein fine particles of an adsorbent material. The method of the invention includes the following steps: spinning at least two cuprammonium spinning solutions from adjacent slots of a spinning head for immediate layer to layer contact and conducting the spun layers over an air gap of not more than 50 times the spacing between the adjacent slots to pass into a precipitating bath, one of said at least two cuprammonium spinning solutions having suspended therein said fine particles of an adsorbent material in an amount of up to 95% by weight and another of said at least two cuprammonium spinning solutions being free of adsorbent particles; and coagulating the layers of spinning solutions in said precipitating bath to firmly adhere to each other and to entrap the fine particles of adsorbent material substantially completely in the spun layer in which said adsorbent material was originally suspended. The spinning solution containing the suspended adsorbent particles is preferably obtained by grinding in a ball mill, and a highly uniform dispersion of the resulting fine particles can then be achieved by continuously mixing and preferably recirculating the suspension by using a holding tank equipped with a mixer or agitator and a circulation pump. Especially good results are achieved in spinning hollow fibers by introducing or injecting isopropyl myristate into the central axial duct of the hollow fiber as it is produced. Other filler fluids may be injected, e.g. a liquid such as water or even a gas, but isopropyl myristate offers special advantages.

The invention is further explained with the help of the accompanying drawing in which.

Figure 2:
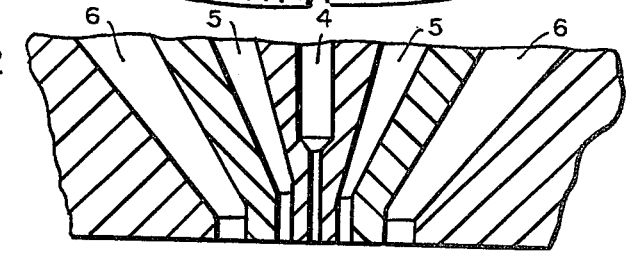
FIG. 2 is a cross-section along the spinning axis of a tubular foil nozzle or spinning head as employed to produce the dialyzing membrane of FIG. 1.
Figure 4:
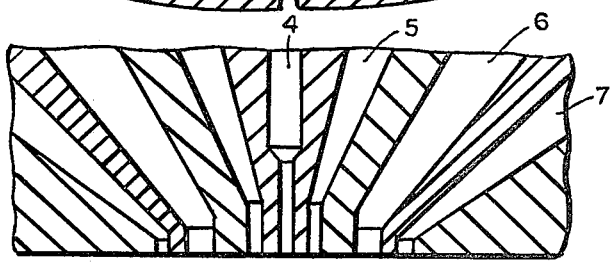
FIG. 4 is a cross-section of another tubular foil spinning nozzle similar to that of FIG. 2 but with an additional annular spinning slot to produce the dialyzing membrane of FIG. 3.

The dialyzing membranes in the form of hollow fibers, tubes or tubular foils are produced according to the invention by spinning at least two different cuprammonium solutions in a typical bicomponent hollow fiber nozzle (see FIG. 2) or in a three-component or higher multicomponent tubular type of nozzle (see FIG. 4). For hollow fibers such as the bicomponent fiber of FIG. 6, one of the two cuprammonium spinning solutions contains suspended therein from 0.1 to 90% by weight of a finely divided adsorbent with a mean particle size of up to 40μ, the percentage by weight being taken with respect to the cellulose content of the spinning solution. This first solution is fed through the outermost channel 6 and the annular spinning slot 6a as shown in FIG. 2 to form the adsorbent layer 2 as shown in cross-section for the hollow fiber of FIG. 6. The second spinning solution preferably consists of a pure cuprammonium cellulose solution or of a mixture of the cuprammonium cellulose with a compatible cellulose derivative. The second solution forms the dialyzing layer 1 (FIG. 6) after being extruded or spun through the innermost channel 5 and annular spinning slot 5a (FIG. 2) A third outermost dialyzing layer 3 can also be formed from a particle-free cuprammonium cellulose spinning solution fed through channel 7 and spun from the annular slot 7a (FIG. 4).

A suitable fluid, especially isopropyl myristate in the production of hollow fibers, is conducted into the hollow fiber axial duct 8 from the center bore 4 during formation of the fiber so as to exert a radially outwardly directed pressure causing the inner cellulosic layer to adhere firmly to the outer adsorbent-containing cellulosic layer 2.

Figure 1:
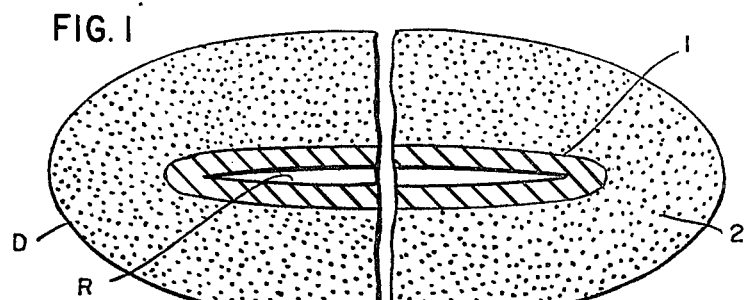
FIG. 1 is a cross-section of a two-layer dialyzing membrane of the invention in the form of a tubular foil which has been flattened or collapsed on itself.
Figure 3:
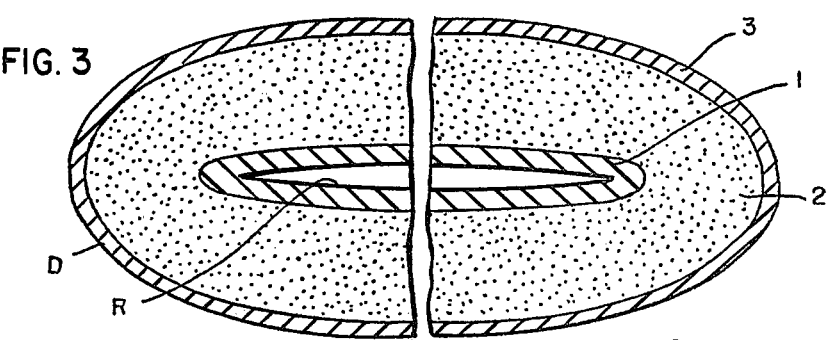
FIG. 3 is a cross-section of a three-layer dialyzing membrane, again in the form of a tubular foil as in FIG. 1.

For the production of a foil tube, i.e. a relatively thin-walled tubular foil as illustrated in FIGS. 1 and 3, the same procedure is followed as in making hollow fibers so as to spin two, three or more cuprammonium spinning solutions, at least one of which contains the adsorbent particles and is directed through channel 6 and slot 6a of the spinning nozzle. Again, it is normally desirable to inject or conduct a fluid, e.g. water, isopropyl myristate or other known fluids into the central axial duct of the hollow membrane as it is being spun, but in this case one may also employ a compressible gas as the filler fluid such as air or an inert gas. Also, as the tubular foil is formed and is at least partly coagulated in the precipitation bath, it is preferably flattened as indicated in FIGS. 1 and 3, for example by means of conventional spaced nip rolls or guide surfaces.

Figure 5:
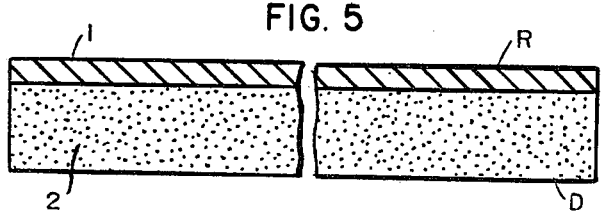
FIG. 5 is a cross-section of a two-layer dialyzing membrane according to the invention in the form of a flat foil, sheet or plate.

For the production of the dialyzing membrane according to the invention in the form of a flat foil, sheet or plate (FIG. 5), the two difference cuprammonium cellulose spinning solutions can be spun through a spinning nozzle containing at least two separately feed slots located in adjacent parallel relationship in a spinning head (not shown). Whether producing flat sheets or hollow tubes or fibers, the streams leaving the various adjacent slots of the spinning nozzle are brought together immediately after leaving the nozzle for passage through an air gap of at most 15 to 50 times the spacing of the nozzle slots from one another, the resulting contacting layers then being conducted into the precipitation bath.

As the precipitation bath, one can adopt the practices followed in the well known cuprammonium process, using the correspondingly well known wash fluids. The cuprammonium process, e.g. for the production of Bemberg rayon, is a very old process and can be found in any standard text such as Carroll-Porczynski, "Natural Polymer Man-Made Fibres" Academic Press, N.Y. (1961), see especially Chapter 7.

During the coagulation and hardening or solidifying of the regenerated cellulose in the precipitation bath, the various streams coming from the nozzle are joined together as the membrane layers firmly adhering to one another. Surprisingly, there is obtained not only a tight cohesion or firm adherence between the two or more distinct cellulosic layers, i.e. a firm self-adherence or self-bonding of one layer to another, but also an entrapment of the fine particles of the adsorbent in the layer in which these particles are spun, i.e. without substantial mixing or passage into the adjacent particle-free layer or layers. Moreover, the properties of the dialyzing membrane are improved even though the adsorbent-containing layer constitutes the major portion of the membrane.

Each of the dialyzing membranes shown in FIGS. 1, 3, 5 and 6 has a retentate side R which faces the blood chamber in a dialysis machine and an opposite dialysate side D. It will be noted that a dialyzing layer 1 face the blood chamber or forms the retentate side R of membrane but may also be used as an outer third layer 3 on the dialysate side D as shown in FIG. 3. A similar third layer may also be added to the dialysate side D of the flat sheet membrane of FIG. 5 or the hollow fiber membrane of FIG. 6. Also, it will be apparent that an additional adsorbent-containing layer may be added on the dialysate side or the illustrated single adsorbent layer may be made up of two or three distinct layers with different adsorbent materials and/or different proportions in each layer. Adsorbent properties of the membrane can thus be varied within a wide range and adjusted to the impurities to be adsorbed.

While the cellulosic layers containing an adsorbent employed in the flat sheet or tubular foil membranes can have a thickness of at least 10μ and even up to 100μ, preferably 20 to 50μ, the thickness of the layer of regenerated cellulose arranged on the retentate side R amounts to 1 to 10μ, preferably 4 to 6μ. It has proved advantageous in those cases in which the dialyzing layer 1 on the retentate side R is chosen to be 5μ and less, to then arrange on the dialysate side D a further dialyzing layer 3 of a thickness of about 1 to 5μ, preferably 2 to 3μ, also composed of regenerated cellulose free of adsorbent particles and spun to adhere firmly to the outer surface of the intermediate absorbing layer 2 of cellulose in which the adsorbent particles are embedded. (See the three-layer tubular foil of FIG. 3.)

Figure 6:
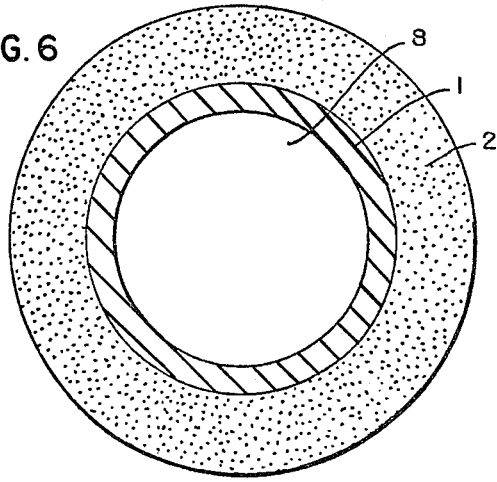
FIG. 6 is a cross-section of a two-layer dialyzing membrane according to the invention in the form of a hollow fiber produced with a bicomponent hollow fiber spinning nozzle of a construction such as that shown in FIG. 2.

When using dialyzing membranes in the form of hollow fibers as in FIG. 6, the mean particle size of the adsorbent preferably amounts up to 40μ. This means that at least 80% of the particles have a diameter of 40μ or less. The presence of a few particles with larger diameter is harmless so that particle sizes given herein are intended to measure a mean particle size. When the dialyzing membranes according to the invention are in the form of foil tubing or flat sheets, the largest adsorbent particles should ordinarily have a diameter of less than 75% of the thickness of the layer into which they are embedded or entrapped. Otherwise if a larger particle diameter is used, there is a danger that the dialyzing membrane will be abraded all the way through by such large adsorbent particles working out of the dialysate side D away from the blood, which in turn leads to a leakage inside the dialyzing membrane. In many instances, especially for hemodialysis, the use of adsorbents with a mean particle size of 20 to 40μ has proved to be most successful.

The hollow fiber membranes according to the invention (FIG. 6) generally have an inside diameter of 50 to 1,000μ, preferably 100 to 300μ, and a total wall thickness of 20 to 100μ, preferably 30 to 50μ. The dialyzing layer 1 consisting essentially of pure regenerated cellulose and also a cellulose derivative as a modifying additive where appropriate, is generally much thinner than the layer 2 containing adsorbent particles, i.e. the dialyzing layer 1 has a thickness of about 1 to 10μ, preferably 5 to 15μ.

Adsorbents which are generally useful for purposes of the invention include active carbon, aluminum oxide, zirconium oxide, zirconium phosphate, silicic acids and/or silicates. These adsorbents are always used in very finely divided form, i.e. as very fine particles obtained in a conventional manner. The most effective adsorbents are selected according to the substances to be adsorbed. For example, with large-pored active carbons, it is possible to adsorb molecules of intermediate or so-called middle molecular weight, while the fine-pored active carbons are especially well adapted to adsorb lower molecular weight substances.

As another example, $Al_2O_3$ adsorbents are especially useful for the adsorption of phosphates, and silicic acid in the form of colloidal silica or silica gels offers a relatively broad range of utility as the adsorbent particles. Moreover, zirconium oxide, zirconium phosphate and silicates are all suitable as adsorbents. All adsorbents may be used individually and also in combination with each other. Advantageously, each adsorbent can be arranged in separate layer while using differing amounts of each adsorbent to achieve optimum results for specific adsorbed substances.

The dialyzing layer 1 lying on the retentate or blood side R of the membrane consists essentially of a pure regenerated cellulose as obtained in the cuprammonium process, but it can also be formed in part, e.g. up to about 70%, of a cellulose derivative which increases the permeability of the dissolved substances. Suitable derivatives are, for example, carboxymethyl cellulose, an alkylcellulose such as methylcellulose, or an aminocellulose. These cellulose derivatives must have the essential cellulose chain structure with variations only in the presence of added substituents on the cellulosic chain. For example, commercial methylcellulose has a methoxyl content of about 29%. The layer 2 containing adsorbent particles may also contain about the same proportion, i.e. up to about 70%, of a cellulose derivative. In all cases these cellulose derivatives can be employed to offer minor variations in both the physical and also the chemical properties of the dialyzing membrane without departing from the spirit or scope of the invention.

In an especially advantageous embodiment of the invention, the inner axial hollow space of the dialyzing membrane, particularly the axial duct of the hollow fiber membrane, is filled with isopropyl myristate. This liquid agent is conducted through the center feed channel 4 of the spinning nozzle for injection or conduction into the center of the freshly spun hollow fiber or filament so as to act as a non-solidifying filler fluid which forms the axial duct during the manufacture of each individual fiber. The isopropyl myristate as the filler fluid is preferably retained in the hollow fiber until it is used, i.e. by sealing off the ends of a continuous hollow fiber which has been produced according to the process of the invention. In filling the hollow fiber during this process, the lead end or first recovered fiber end is already sealed off to permit injection of the isopropyl myristate so as to occupy the space 8 corresponding to the blood chamber of a hemodialyzing membrane. The pressure exerted by the fluid in the axial duct not only assists in forming the hollow fiber but also ensures a firm bond between adjacent annular layers of the membrane.

In comparison to other fluids which have been injected according to known processes, such as halohydrocarbons, toluene, phenols, etc., it has been found that isopropyl myristate has the advantage of being completely isoluble in water and of having a viscosity of 3-4 cP which is higher than that of water. Also, isopropyl myristate is easily removed with ethanol in which it is well soluble. Moreover, isopropyl myristate is non-toxic and very compatible with blood. In other respects, this particular compound is easily handled and capable of being used in the spinning of hollow fibers with great safety and under normal processing conditions.

Once produced in accordance with the process of the invention, the different types of dialyzing membranes may be used in any conventional dialysis machine without requiring special arrangements or difficult techniques.

The invention is explained in greater detail and by way of example as follows:

EXAMPLE 1

Production of cuprammonium solution containing dispersed adsorbent

The cuprammonium solution was mixed with a dispersion of one or more adsorbents, for example active carbon, in such a manner as to achieve a very complete and uniform dispersion of the adsorbent particles in a spinning solution. For example, the dispersion was branched off from a circulation line having a pump to keep the dispersion constantly in movement, and before a screw mixer leading to the spinning operation, the agitated dispersion was combined with a stream of cellulose solution in the ratio of 5.5 parts by weight of active carbon to 4.5 parts by weight of cellulose. For the preparation of this initial dispersion itself, the adsorbent such as active carbon was suspended in water to which there had been added aqueous $NH_3$ and Tylose (methylcellulose), and resulting suspension was ground for about 2 days in a ball mill. The resulting dispersion was then introduced into a container or holding tank in which it was constantly agitated or maintained in movement by steadily pumping in circulation. 100 grams of the initial dispersion had the following composition:
Active carbon: 24.0 grams
$NH_3$ conc.: 0.5 grams
Tylose: 0.4 grams
Water: 75.1 grams

EXAMPLE 2

Preparation of the dialyzing membrane
  (a) Hollow fiber membrane

The following procedure was adopted for the preparation of a dialyzing membrane according to the invention in the form of a hollow fiber, consisting of two layers of $300\mu$ in diameter, a wall thickness of $10\mu$ for the inner adsorbent-free layer and a wall thickness of $50\mu$ for the adsorbent-containing layer.

An adsorbent-containing cuprammonium solution prepared according to Example 1 was fed by means of a dosage pump to the outer annular slot of a double-slot nozzle used for spinning hollow filaments such as that of FIG. 2 with circular and concentric slots around the central bore 4. To the inner annular slot of the same nozzle there were simultaneously fed a 9% cuprammonium cellulose solution, while to the central bore of this nozzle there was fed isopropyl myristate as the filler fluid.

The dosage amounts of the 3 separately fed fluids were carefully apportioned so that after passing through an alkaline bath a sulfuric acid bath and a water bath, followed by drying of the thread, the wall thicknesses and diameter correspond to the desired hollow fiber structure (the diameter here has been measured as the inside diameter of the hollow fiber). With a filament draw-off of 20 meters per min., the dosage amounts for each fluid were as follows:
Filler fluid: 1.42 ml/min.
Cuprammonium solution: 1.98 ml/min.
Adsorbent solution: 10.8 ml/min.
  (b) Tubular foil membrane Through a tubular foil nozzle which has two or more separately fed, concentrically arranged circular slots (cf. FIG. 2 or FIG. 4), the required cuprammonium solutions were extruded and coagulated in a conventional precipitation or coagulation bath. By means of a gas or a liquid filling, for example water, fed into the hollow interior of the freshly extruded foil tube, the inner layer was solidly joined with the outer layer or layers as the spun solutions coagulate. The tubular foil was then laid flat by a deflection roller inside the precipitation bath, and the flattened tube was then washed and further processed by the procedure commonly followed in the known cuprammonium porcess. Using separate feed means, a conventional cuprammonium solution is thus extruded through the innermost spinning slots, and the cuprammonium solution containing the uniformly and finely dispersed adsorbent is extruded through the next adjacent concentric slot 6. For a three layer construction (cf. FIG. 4), a conventional cuprammonium solution can be extruded again in a thin layer formed by the outermost concentric slot 7.

EXAMPLE 3

Comparative tests using different dialyzing membranes

The dialyzing membrances obtained according to Example 2 were installed in a test dialyzer and compared with a conventional single layer tubular foil for clearance values in vitro, as well as for ultrafiltration performance. In these tests, the ultrafiltration performances (water permeability), despite only a very thin cellulose wall, were in the low range sought of 3 to 4 m./hr.$m^2$.mm Hg at 37° C. The clearance values for creatinine and vitamin $B_{12}$ were determined by the single pass process and calculated for an effective surface of 1 $m^2$ under the standard flow conditions: QB=200 ml/min; and QD=500 ml/min. Typical values are listed in the following table for each of the different dialyzing membranes, mesured under comparable conditions.

TABLE

| Clearance Values | Urea ml/min . $m^2$ | Creatinine ml/min . $m^2$ | Vitamin $B_{12}$ ml/min . $m^2$ |
|---|---|---|---|
| Conventional tubular foil | 125 | 114 | 21 |
| Tubular foil according to the invention with an A-carbon layer M-type | 121 | 95 | 60 |
| Tubular foil according to the invention with an A-carbon layer L-type | 125 | 130 | 50 |
| Hollow fiber membrane according to the invention with an A-carbon layer | — | 137 | 65 |

The surprisingly high Vitamin $B_{12}$ clearance with a moderate ultrafiltration performance confirms the fact that the adsorption promotes the dialysis in a very advantageous manner.

The invention is hereby claimed as follows:

1. A dialyzing membrane for hemodialysis in the form of a hollow fiber, a tubular foil or a flat sheet formed by regeneration of cellulose from a cuprammonium solution, said membrane comprising at least two firmly self-adhered cellulosic layers with at least one of said layers being a dialyzing layer consisting essentially of a semipermeable regenerated cellulose having a thickness of about 1 to $10\mu$ and at least one other of said layers being an adsorbent layer consisting essentially of a semipermeable regenerated cellulose having a thickness of about 10 to $100\mu$ in which fine particles of an adsorbent material are embedded in an amount of up to 95% by weight of the adsorbent layer.

2. A dialyzing membrane as claimed in claim 1 wherein said adsorbent material is selected from the group consisting of active carbon, aluminum oxide, zirconium oxide, zerconium phosphate, silicic acid, silicates and mixtures thereof.

3. A dialyzing membrane as claimed in claim 1 having three layers, said dialyzing layer being on the retentate side of the membrane, said adsorbent layer being in the middle and a further adsorbent-free cellulosic layer being on the dialysate side of the membrane.

4. A dialyzing membrane as claimed in claim 1 wherein the cellulosic layers form a hollow fiber, the adsorbent layer consisting essentially of a regenerated cellulose containing about 1 to 95% by weight of adsorbent particles uniformly distributed and embedded therein, said particles having a mean particle size of up to about $40\mu$.

5. A dialyzing membrane as claimed in claim 4 wherein the adsorbent layer is arranged on the outer dialysate side of the hollow fiber and the dialyzing layer is arranged on the inner retentate side around the interior duct of the hollow fiber.

6. A dialyzing membrane as claimed in claim 4 wherein the interior duct of the hollow fiber is filled with isopropyl myristate.

7. A dialyzing membrane as claimed in claim 5 wherein the interior duct of the hollow fiber is filled with isopropyl myristate.

8. A dialyzing membrane as claimed in claim 4 wherein the adsorbent layer contains about 20 to 70% by weight of adsorbent particles.

9. A dialyzing membrane as claimed in claim 8 wherein the adsorbent particles have a mean particle size of about 20 to 40$\mu$.

10. A dialyzing membrane as claimed in claim 9 wherein the interior duct of the hollow fiber is filled with isopropyl myristate.

11. A dialyzing membrane as claimed in claim 1 wherein the cellulosic layers form a tubular foil or flat sheet, a dialyzing layer consisting essentially of a regenerated cellulose being arranged on the retentate side of the membrane and said at least one adsorbent layer being arranged on the dialysate side of the membrane, the adsorbent particles in said adsorbent layer having a particle size of less than 75% of the thickness of said adsorbent layer.

12. A dialyzing membrane as claimed in claim 11 wherein the adsorbent layer contains about 20 to 70% by weight of adsorbent particles.

13. A dialyzing membrane as claimed in claim 11 wherein the dialyzing layer has a thickness of about 4 to 6$\mu$ and said at least one adsorbent layer has a thickness of about 20 to 50$\mu$.

14. A dialyzing membrane as claimed in claim 3 wherein the dialyzing layer on the retentate side of the membrane has a thickness of about 1 to 5$\mu$, the middle adsorbent layer has a thickness of about 10 to 100$\mu$, and the adsorbent-free cellulosic layer on the dialysate side has a thickness of about 1 to 5$\mu$.

15. A dialyzing membrane as claimed in claim 14 wherein the middle adsorbent layer has a thickness of about 20 to 50$\mu$.

* * * * *